(12) United States Patent
Lee

(10) Patent No.: US 8,402,608 B2
(45) Date of Patent: Mar. 26, 2013

(54) HINGE

(75) Inventor: Chung-Yu Lee, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 623 days.

(21) Appl. No.: 12/640,070

(22) Filed: Dec. 17, 2009

(65) Prior Publication Data

US 2011/0146028 A1    Jun. 23, 2011

(51) Int. Cl.
*E05C 17/64* (2006.01)
(52) U.S. Cl. ................... 16/337; 16/319; 16/374
(58) Field of Classification Search ........... 16/232, 16/234, 319, 337, 363, 371, 374, 382, 386, 16/387, 390, DIG. 43
See application file for complete search history.

(56) References Cited

U.S. PATENT DOCUMENTS

| | | | | |
|---|---|---|---|---|
| 5,896,622 A * | 4/1999 | Lu | | 16/342 |
| 6,430,777 B1 * | 8/2002 | Lu | | 16/340 |
| 6,671,929 B1 * | 1/2004 | Lu | | 16/342 |
| 6,748,625 B2 * | 6/2004 | Lu | | 16/285 |
| 6,804,859 B2 * | 10/2004 | Lu et al. | | 16/342 |
| 6,983,514 B2 * | 1/2006 | Lu et al. | | 16/342 |
| 7,124,473 B2 * | 10/2006 | Lu et al. | | 16/342 |
| 2003/0163900 A1 * | 9/2003 | Rude et al. | | 16/337 |
| 2004/0181908 A1 * | 9/2004 | Lu et al. | | 16/319 |
| 2006/0288535 A1 * | 12/2006 | Lu et al. | | 16/387 |
| 2007/0151079 A1 * | 7/2007 | Lu et al. | | 16/337 |
| 2008/0022492 A1 * | 1/2008 | Lee et al. | | 16/337 |

* cited by examiner

*Primary Examiner* — Roberta Delisle
(74) *Attorney, Agent, or Firm* — Alan Kamrath; Kamrath IP Lawfim, P.A.

(57) ABSTRACT

A hinge is mounted between a cover and a base of an electronic device and has a supporting bracket, a rotating bracket, a mounting bracket and a pintle. The supporting bracket is connected to the base, and the rotating bracket is connected to the cover. The mounting bracket is attached to the supporting bracket and has a positioning wing and two sleeves. The pintle is attached to the rotating bracket, is mounted through the mounting bracket and has a flat wall. The flat wall of the pintle selectively abuts against the positioning wing of the mounting bracket to hold the cover at a desired position. The abrasion between the sleeves and the pintle balances torque.

19 Claims, 17 Drawing Sheets

HINGE

BACKGROUND OF THE INVENTION

1. Field of the Invention

The present invention relates to a hinge and, especially, to a hinge mounted between a cover and a base of an electronic device to allow pivoting.

2. Description of the Prior Arts

Electronic devices are widely used in modern life, such as notebook computers, mobile phones and the like. For example, a notebook computer has a cover and a base mounted pivotally to each other by a conventional hinge. To position the cover at a predetermined pivoting angle, the conventional hinge has multiple positioning washers cooperating with each other. Therefore, the cover is held at a predetermined pivoting angle via the positioning washers. However, the positioning washers increase the volume and the cost of the conventional hinge. As the electronic device is miniaturized or has extra functions added, more inside space is required to house electrical components so less room is available for the hinge. Thus, the conventional hinge with positioning washers requires further miniaturization.

To overcome the shortcomings, the present invention provides a hinge to mitigate or obviate the aforementioned problems.

SUMMARY OF THE INVENTION

The main objective of the present invention is to provide a hinge with fewer components but still offers sufficient torque for positioning. The hinge is mounted between a cover and a base of an electronic device and has a supporting bracket, a rotating bracket, a mounting bracket and a pintle. The supporting bracket is connected to the base and the rotating bracket is connected to the cover. The mounting bracket is attached to the supporting bracket and has a positioning wing and two sleeves. The pintle is attached to the rotating bracket, is mounted through the mounting bracket and has a flat wall. The flat wall of the pintle selectively abuts against the positioning wing of the mounting bracket to hold the cover at a desired position. Abrasion between the sleeves and the pintle provides a positioning effect.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
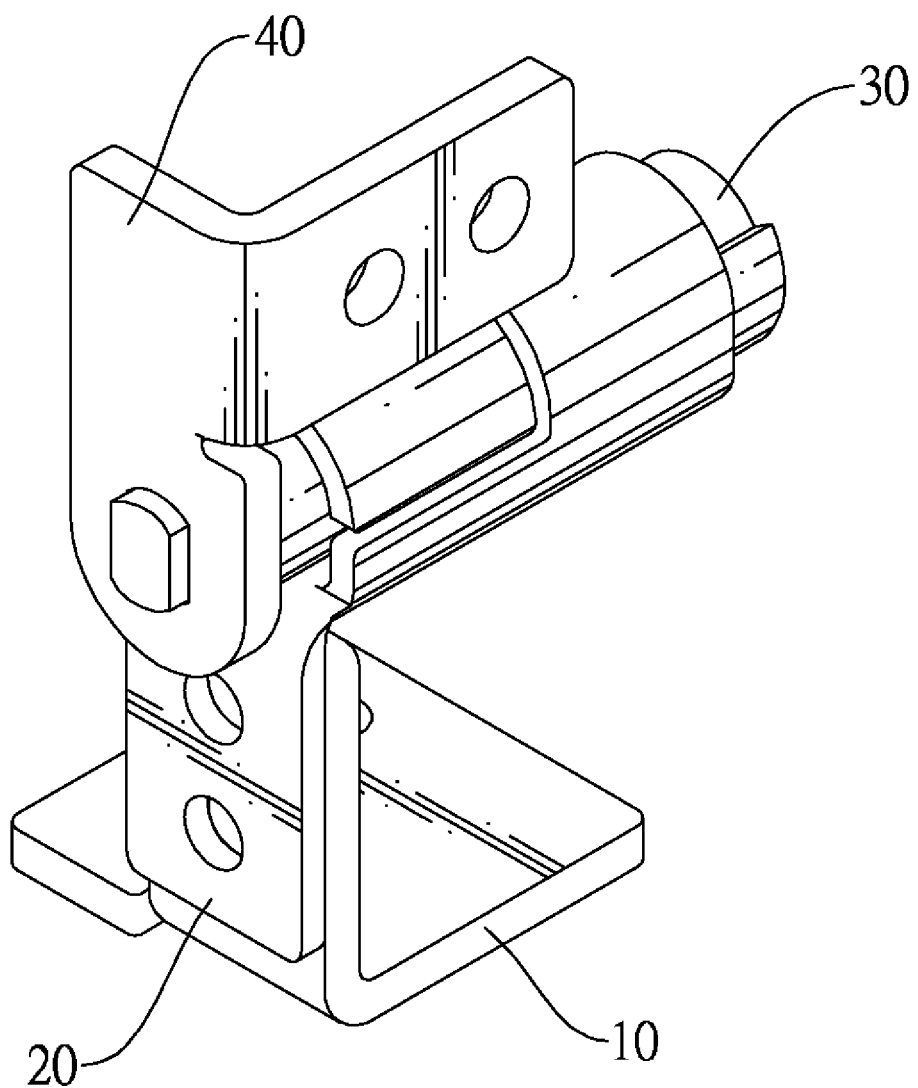
FIG. 1 is a perspective view of a first embodiment of a hinge in accordance with the present invention.
Figure 2:
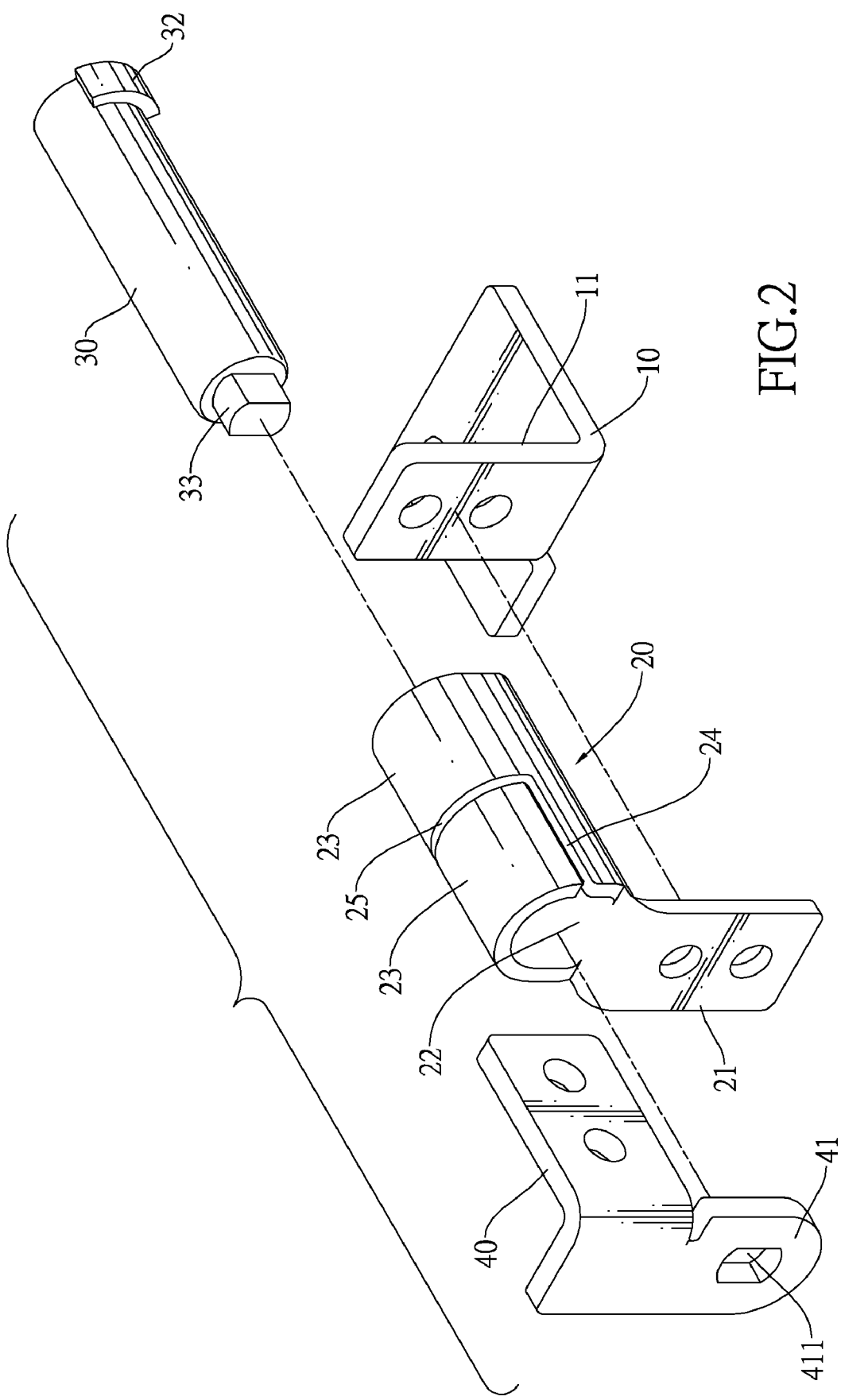
FIG. 2 is an exploded perspective view of the hinge in FIG. 1.
Figure 3:
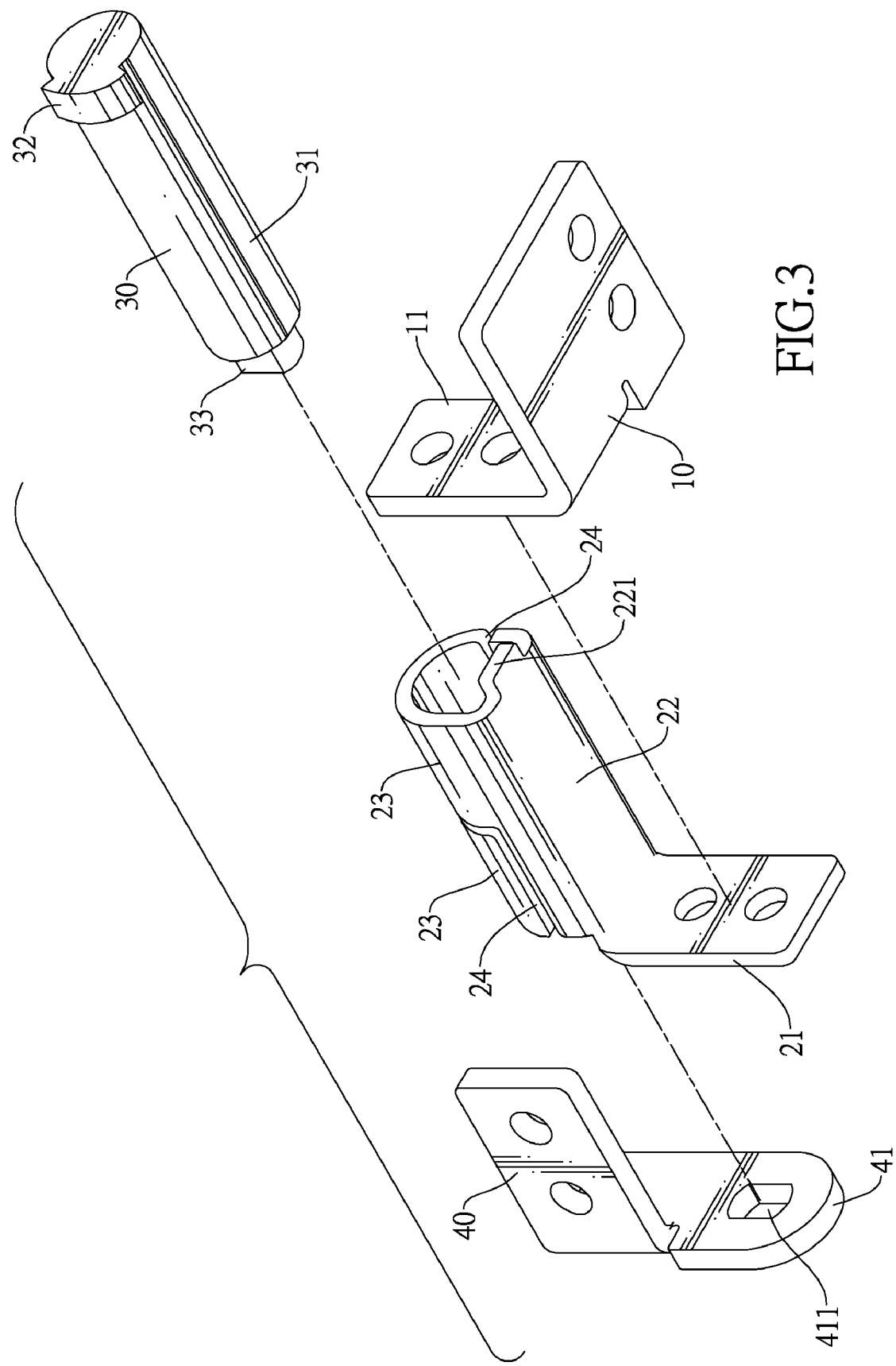
FIG. 3 is another exploded perspective view of the hinge in FIG. 1.

With reference to FIGS. 1 to 3, a hinge in accordance with the present invention comprises a supporting bracket (10), a mounting bracket (20), a pintle (30) and a rotating bracket (40).

The supporting bracket (10) has a fastening wing (11).

The mounting bracket (20) is attached securely to the supporting bracket (10) and has a positioning wing (22) and two sleeves (23). The sleeves (23) are formed across the positioning wing (22) and align with each other. Each sleeve (23) has a connecting edge and a free edge. The connecting edge of the sleeve (23) connects with one side edge of the positioning wing (22). A slit (24) is formed between the free edge of the sleeve (23) and the other side edge of the positioning wing (22). A gap (25) is formed between the sleeves (23).

The pintle (30) is mounted rotatably through the sleeves (23) and has a flat wall (31) and a keyed protrusion (33). The flat wall (31) selectively abuts against the positioning wing (22) to provide a positioning function. The keyed protrusion (33) is formed on and protrudes axially from one end of the pintle (30).

The rotating bracket (40) is mounted securely on the pintle (30) and has a fastening wing (41) with a keyed hole (411). The keyed hole (411) engages with the keyed protrusion (33) of the pintle (30) to mount the rotating bracket (40) securely on the pintle (30).

The hinge as described is mounted between a cover and a base of an electronic device. The rotating bracket (40) is connected to the cover. The supporting bracket (10) is connected to the base. When the cover is pivoted relative to the base, the pintle (30) is rotated relative to the mounting bracket (20). When the flat wall (31) of the pintle (30) abuts against the positioning wing (22) of the mounting bracket (20), the hinge as described provides a positioning function to hold the cover at a desired angle. The cooperation between the flat wall (31) and the positioning wing (22) provides a positioning function without adding any components. Therefore, the hinge in accordance with the present invention provides a sufficient positioning function with fewer components.

The hinge in accordance with the present invention has a basic structure as mentioned above. The alternative structures are described below.

Figure 13:
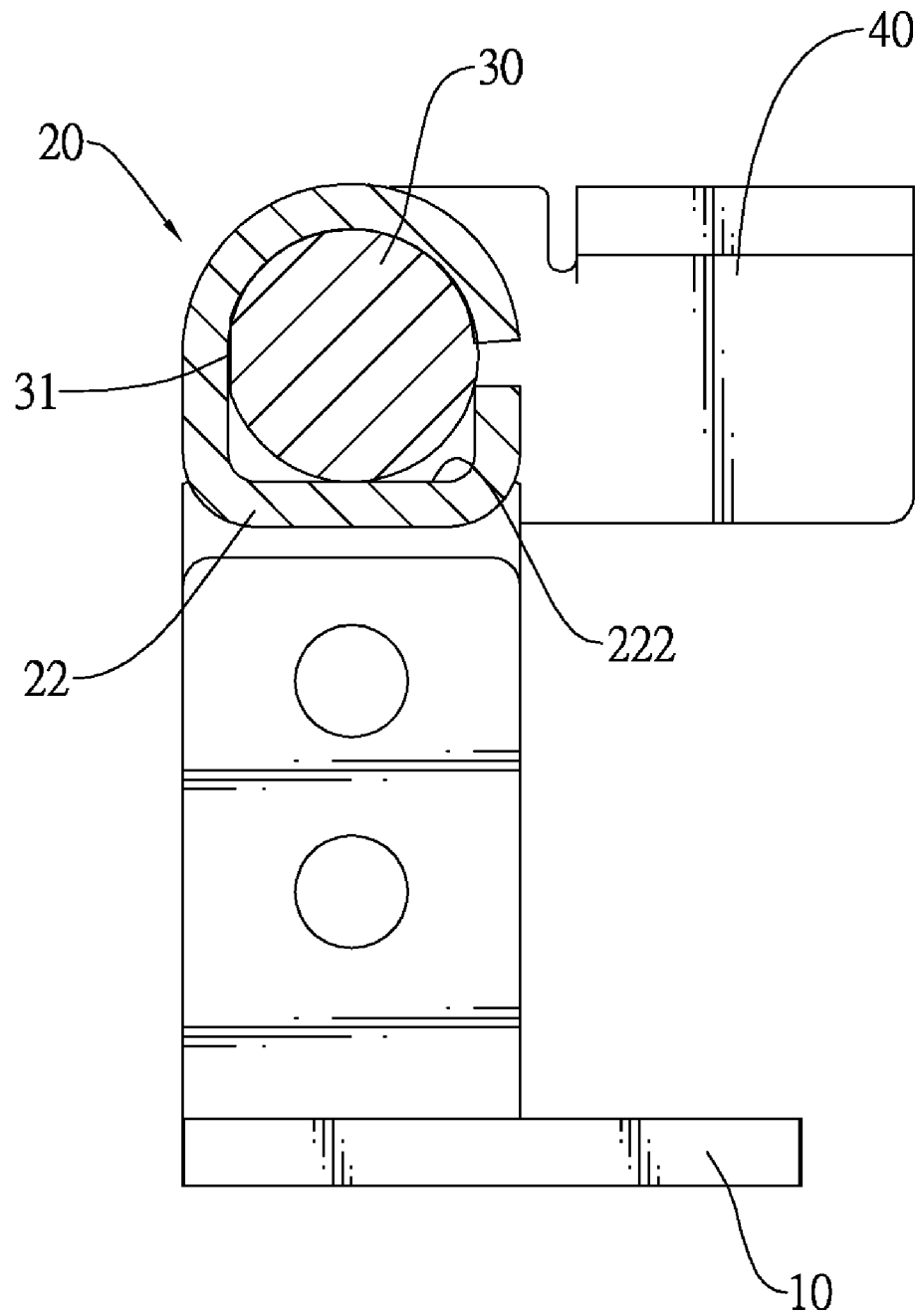
FIG. 13 is an operational end view in partial section of the hinge in FIG. 1.
Figure 14:
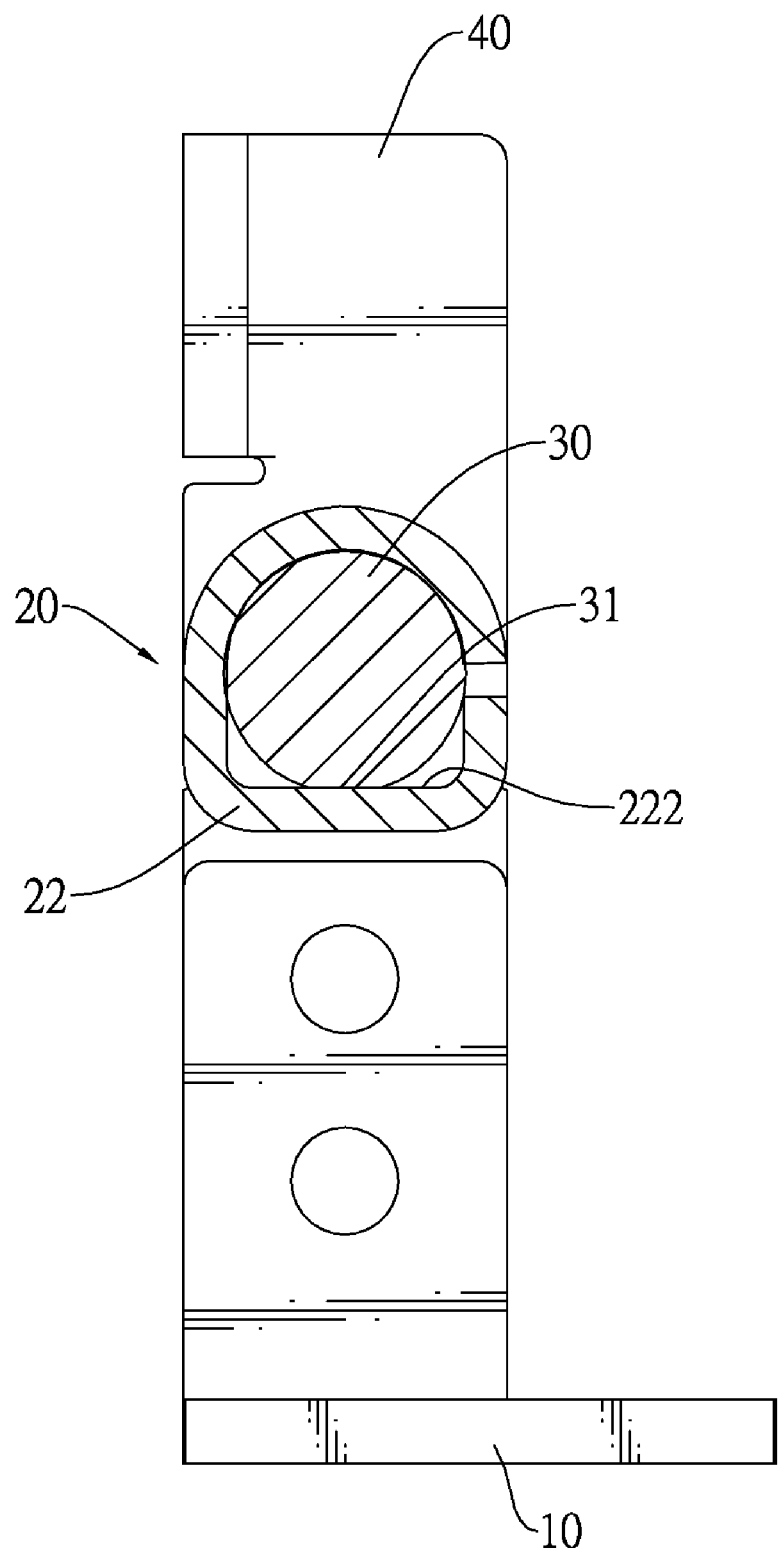
FIG. 14 is another operational end view in partial section of the hinge in FIG. 1.
Figure 15:
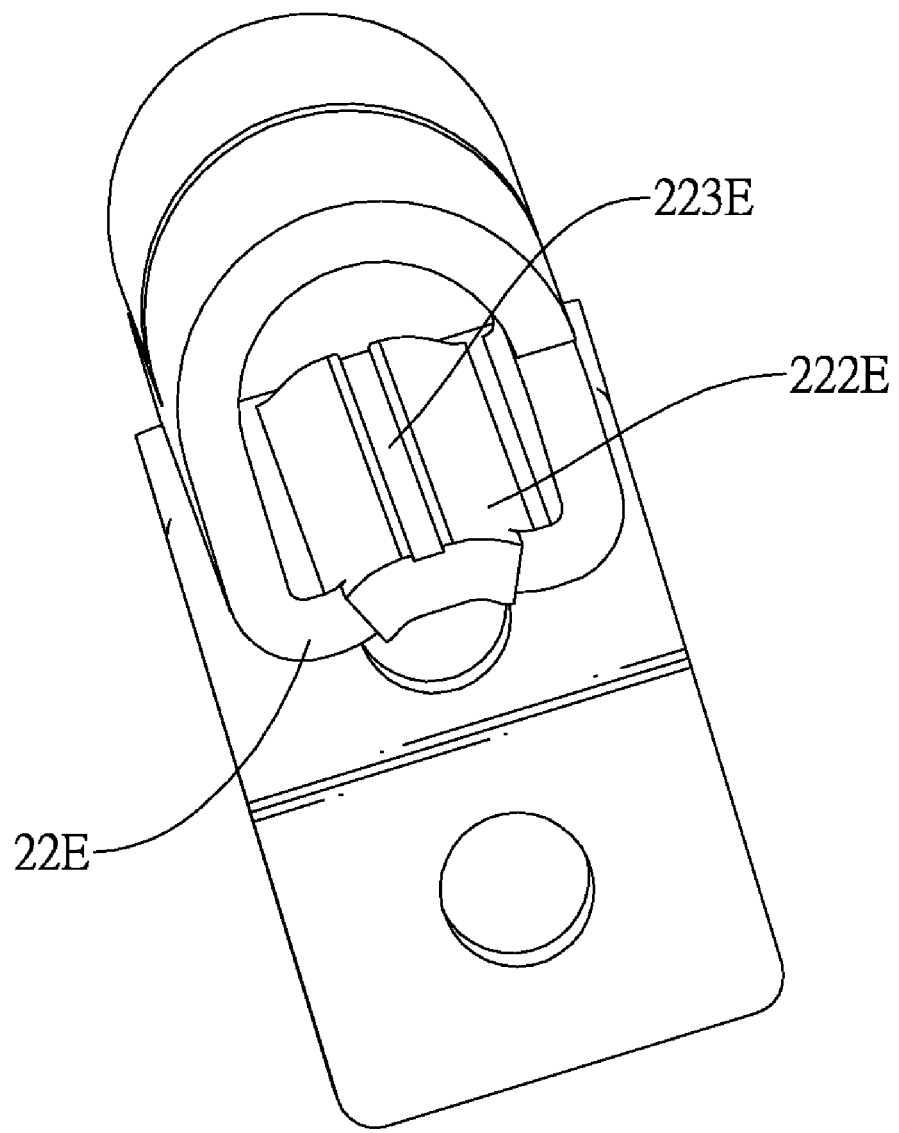
FIG. 15 is a perspective view of a mounting bracket of a sixth embodiment of a hinge in accordance with the present invention.
Figure 16:
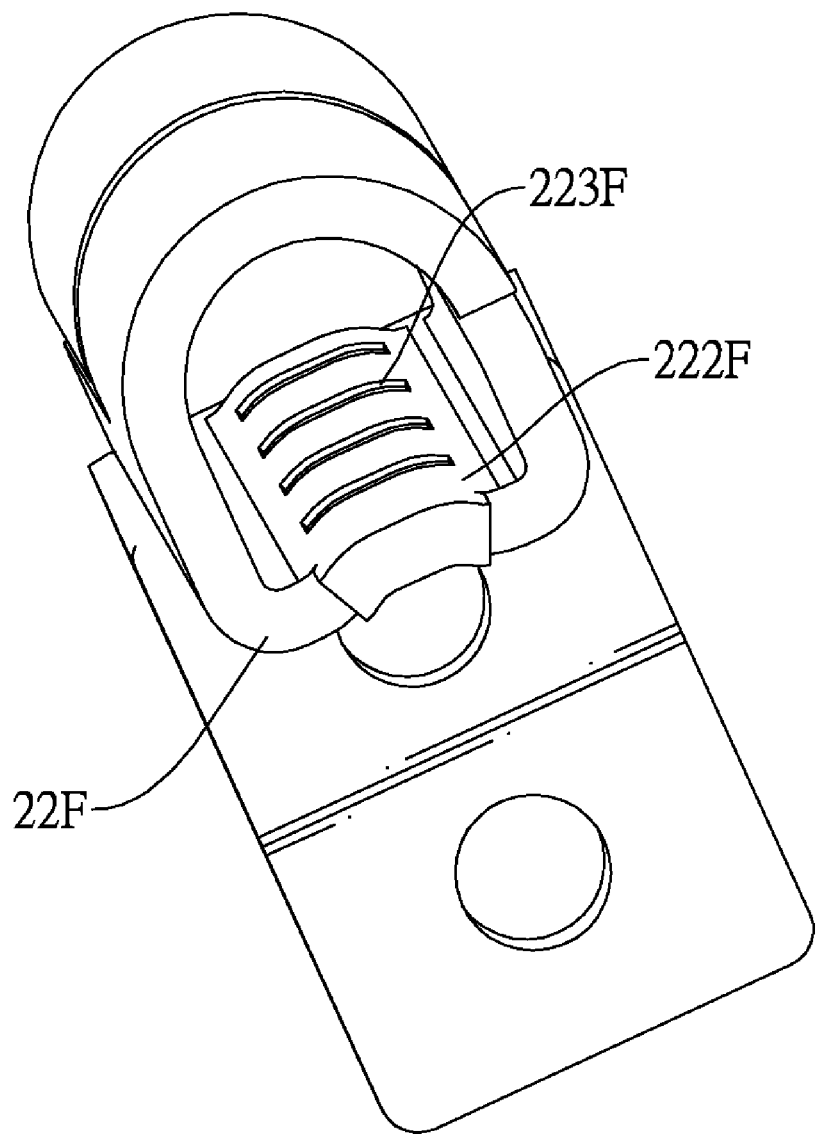
FIG. 16 is a perspective view of a mounting bracket of a seventh embodiment of a hinge in accordance with the present invention.
Figure 17:
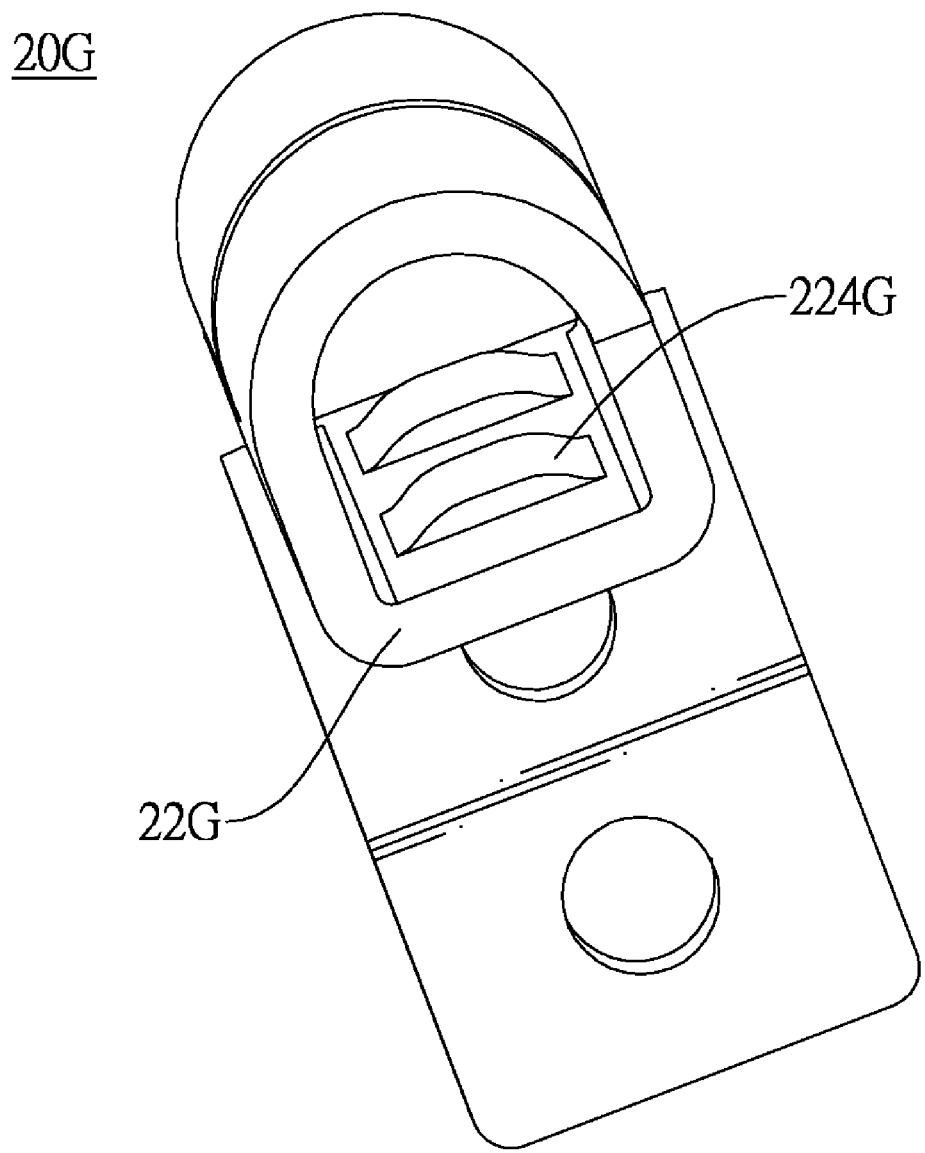
FIG. 17 is a perspective view of a mounting bracket of an eighth embodiment of a hinge in accordance with the present invention.

In a preferred embodiment as shown in FIGS. 13 and 14, the positioning wing (22) has a flat inside wall (222), so that the flat wall (31) of the pintle (30) is selectively flush with the flat inside wall (222) to provide a positioning function. In other preferred embodiments as shown in FIGS. 15 and 16, the positioning wing (22E, 22F) has a positioning rib (222E, 222F) formed longitudinally on an inside wall thereof. The positioning rib (222E, 222F) has a flat top surface that is selectively flush with the flat wall (31) of the pintle (30) to provide a positioning function. At least one groove (223E, 223F) is formed longitudinally or transversely in the positioning rib (222E, 222F) to accommodate lubricant. In still another embodiment as shown in FIG. 17, the positioning wing (22G) of the mounting bracket (20G) has multiple positioning protrusions (224G) formed transversely on an inside wall thereof. Each positioning protrusion (224G) has a flat top surface that is selectively flush with the flat wall (31) of the pintle (30) to provide a positioning function.

Figure 4:
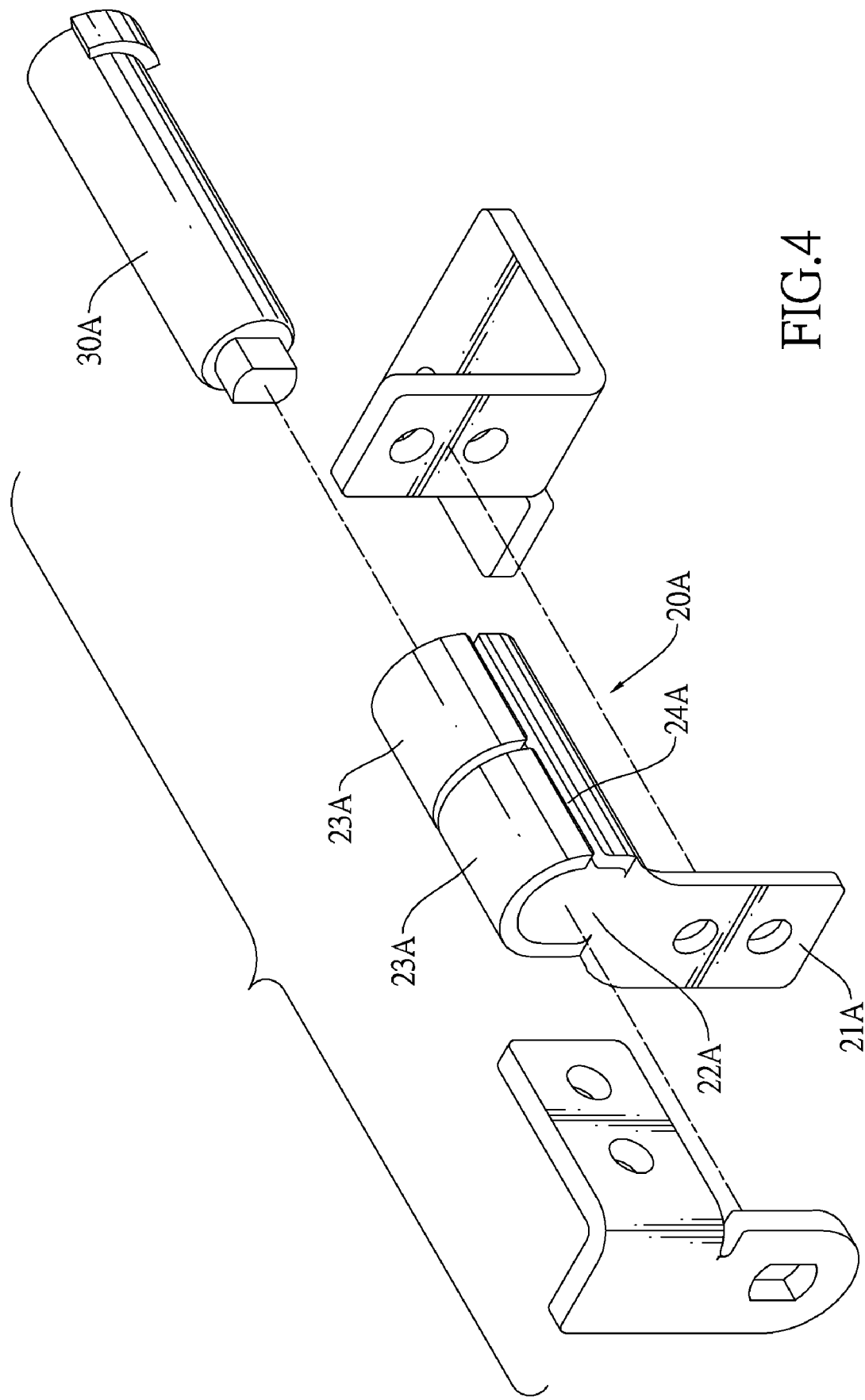
FIG. 4 is an exploded perspective view of a second embodiment of a hinge in accordance with the present invention.
Figure 9:
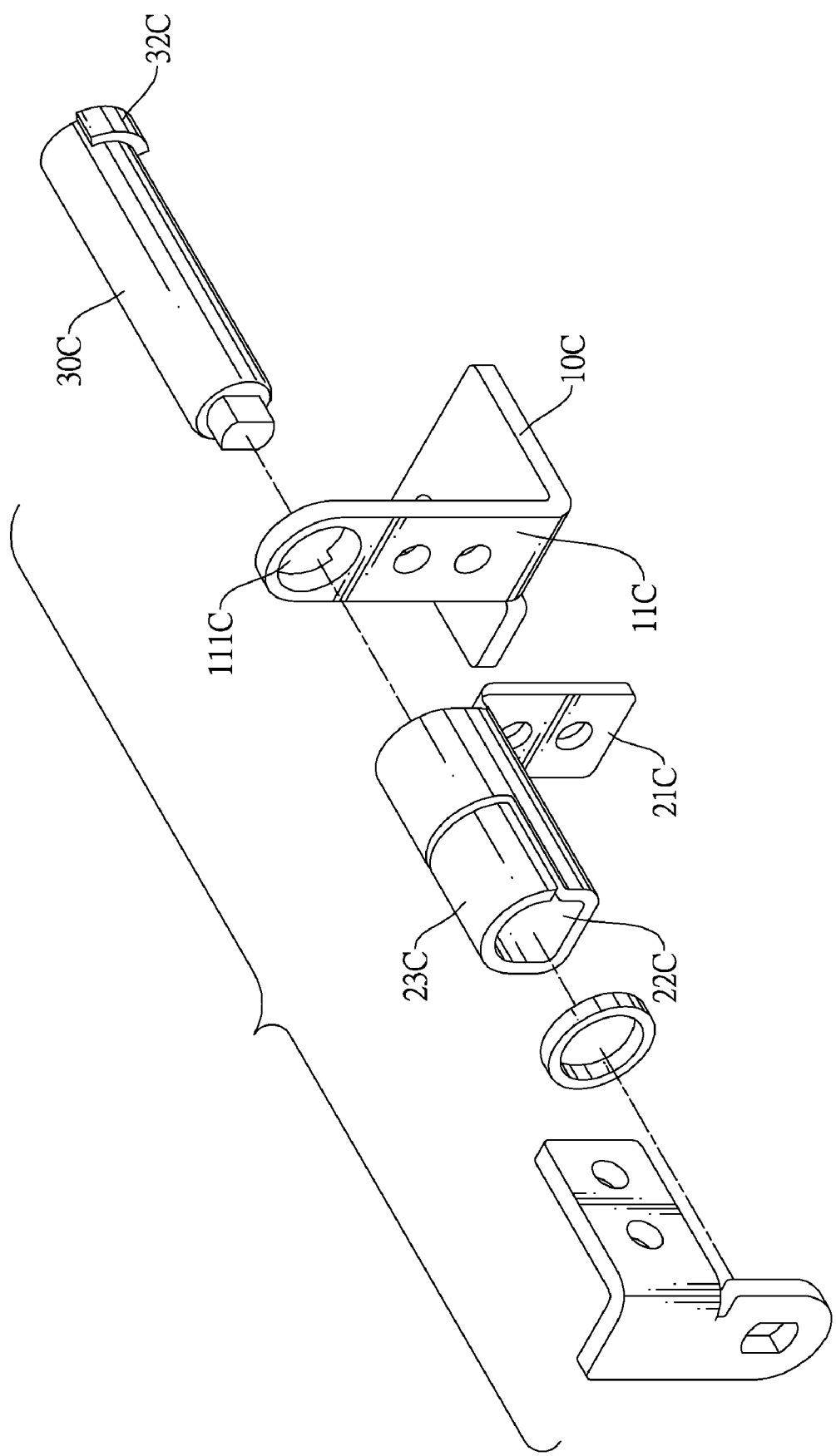
FIG. 9 is an exploded perspective view of the hinge in FIG. 8.

The mounting bracket (20) may have a connecting wing (21) to attach to the fastening wing (11) of the supporting bracket (10). The connecting wing (21) has a first end and a second end. The second end of the connecting wing (21) is adjacent to the rotating bracket (40). In preferred embodiments as shown in FIGS. 2 and 4, the connecting wing (21, 21A) protrudes perpendicularly from the second end of the positioning wing (22, 22A). Thus, the fixing position between the mounting bracket (20, 20A) and the supporting bracket (10) and the fixing position between the pintle (30) and the rotating bracket (40) are located at the same end. In another preferred embodiment as shown in FIG. 9, the connecting wing (21C) protrudes perpendicularly from the first end of the positioning wing (22C) having the sleeve (23C). Thus, the fixing position between the mounting bracket (20C) and the supporting bracket (10C) and the fixing position between the pintle (30C) and the rotating bracket (40) are located at different ends to enhance the stability when the pintle (30C) rotates.

The sleeves (23) may have different forms to change the relation between the slits (24). In preferred embodiments as shown in FIGS. 3 and 9, the sleeves (23, 23D) protrude from different side edges of the mounting bracket (20, 20D) so that the slits (24) misalign with each other. Thus, when the pintle (30) rotates either clockwise or counterclockwise, the sleeves (23) are respectively extended or retracted to balance the torque that the hinge as described provides. In another preferred embodiment as shown in FIG. 4, the sleeves (23A) protrude from the same side edges of the positioning wing (22A), so that the slits (24A) align with each other. Thus, when the pintle (30A) rotates clockwise, the sleeves (23A) are extended and provide an elastic force to resist the pintle (30A) from rotating. Then, the user needs to exert more force to rotate the pintle (30A) clockwise. When the pintle (30A) rotates counterclockwise, the sleeves (23A) are retracted and provide an elastic force to help the pintle (30A) to rotate. Then, the user rotates the pintle (30A) counterclockwise using less force. By the predetermined arrangement with the cover and the base of the electronic device, the user may open the cover via less force and close the cover using more force.

Figure 5:
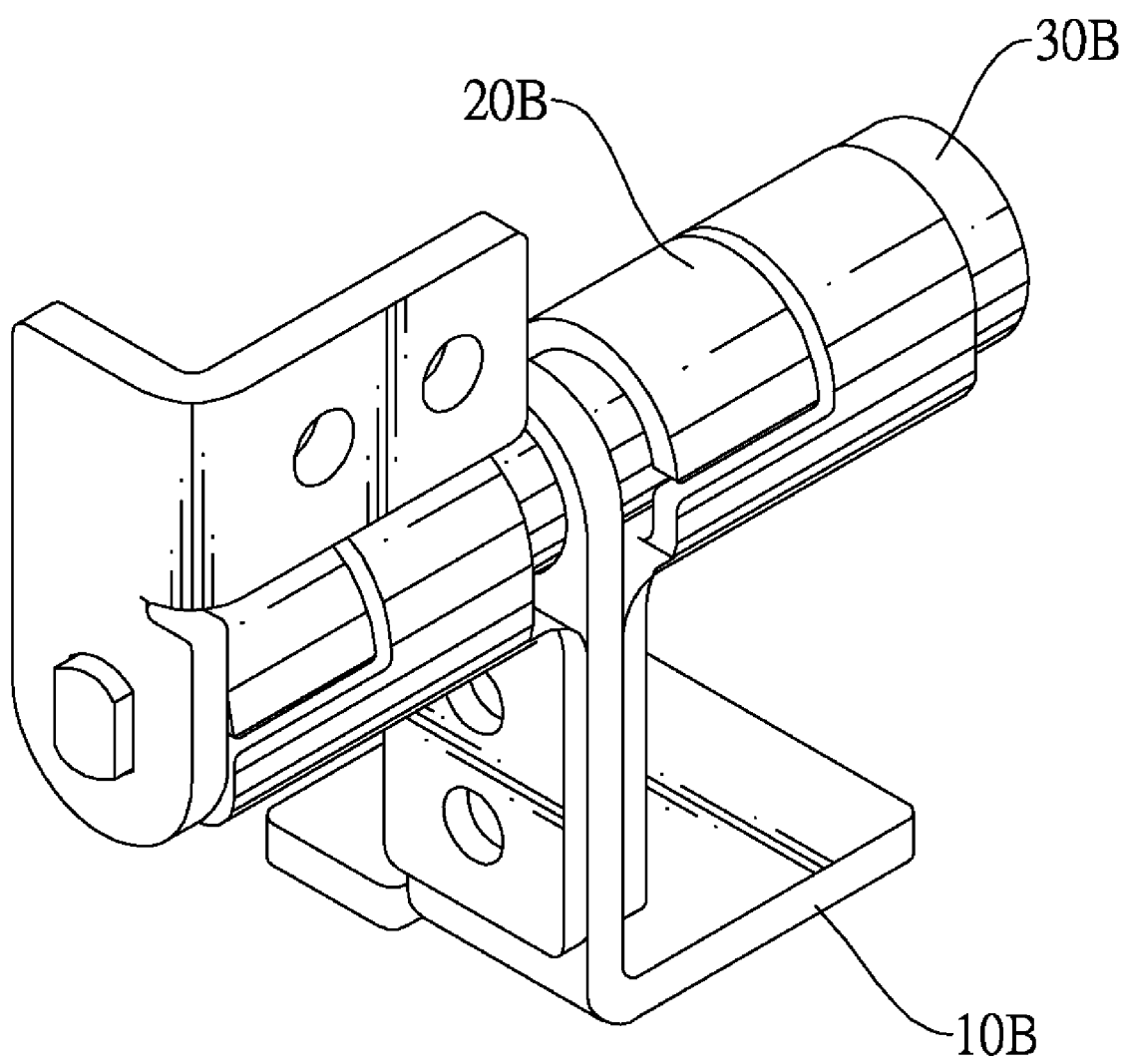
FIG. 5 is a perspective view of a third embodiment of a hinge in accordance with the present invention.
Figure 6:
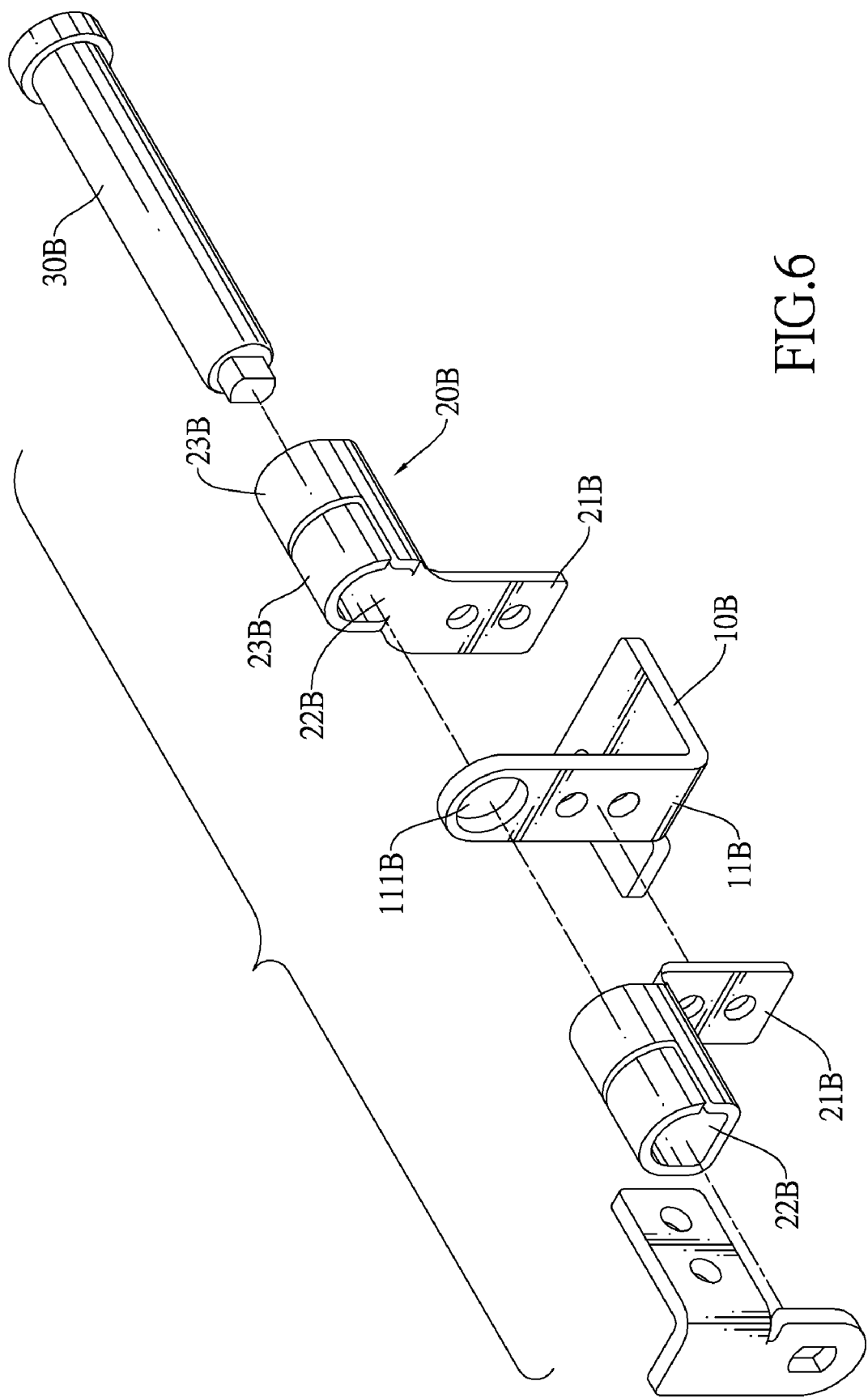
FIG. 6 is an exploded perspective view of the hinge in FIG. 5.
Figure 7:
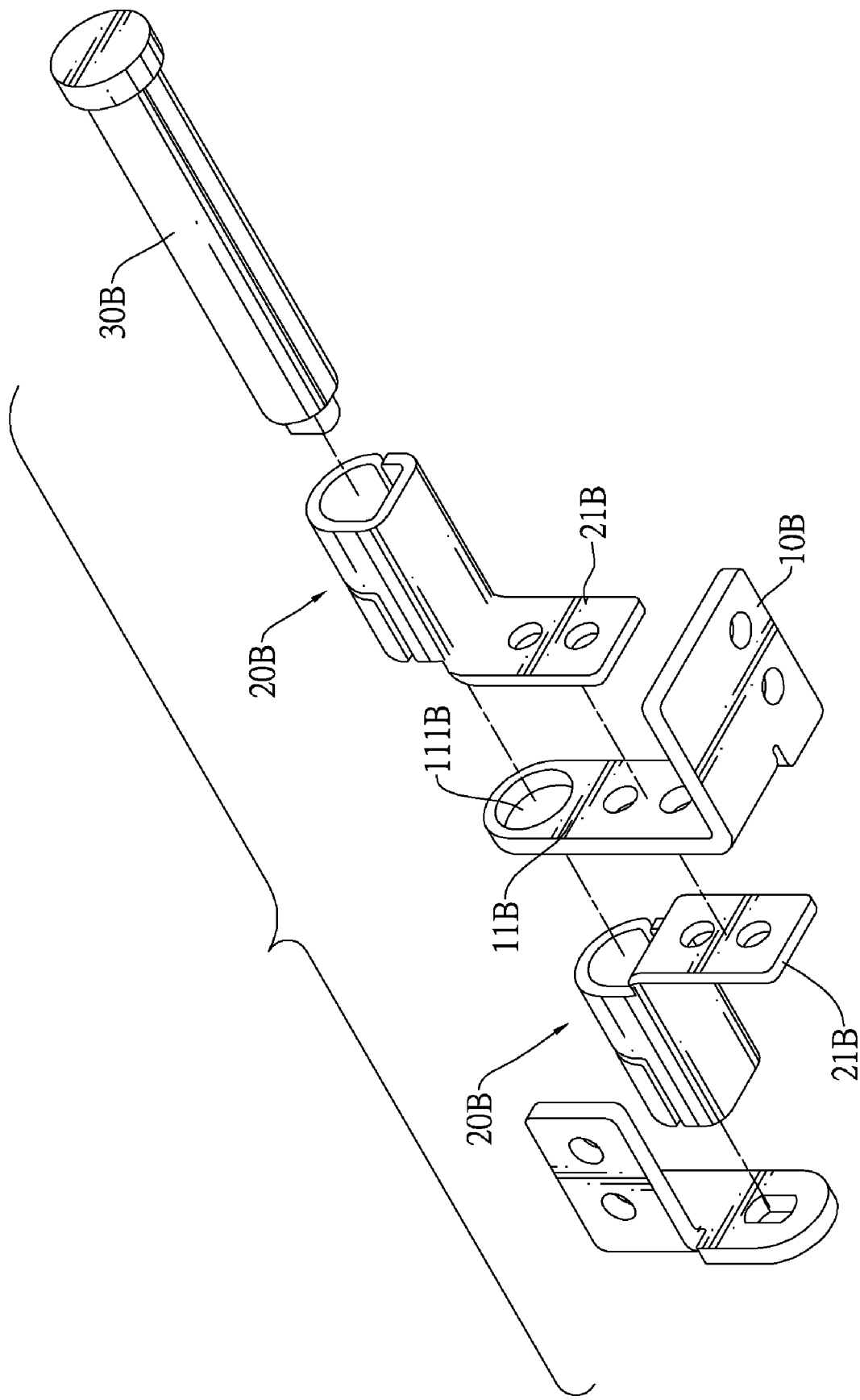
FIG. 7 is another exploded perspective view of the hinge in FIG. 5.

In a preferred embodiment as shown in FIGS. 5 to 7, the hinge as described has two mounting brackets (20B). The mounting brackets (20B) are attached respectively to two sides of the fastening wing (11B) of the supporting bracket (10B). The connecting wing (21B) of one mounting bracket (20B) protrudes from the first end of the positioning wing (22B), and the connecting wing (21B) of the other mounting bracket (20B) protrudes from the second end of the positioning wing (22B). Thus, the fastening wing (11B) of the supporting bracket (10B) is clamped between the connecting wings (21B) of the mounting brackets (20B). A through hole (111B) is formed through the fastening wing (11B). The pintle (30B) is mounted through the through hole (111B) and the sleeves (23B) of the mounting brackets (20B). The sleeves (23B) of the mounting brackets (20B) are mounted symmetrically around the pintle (30B) to balance torque, to enhance the stability during pivoting and to prevent shaking.

Figure 8:
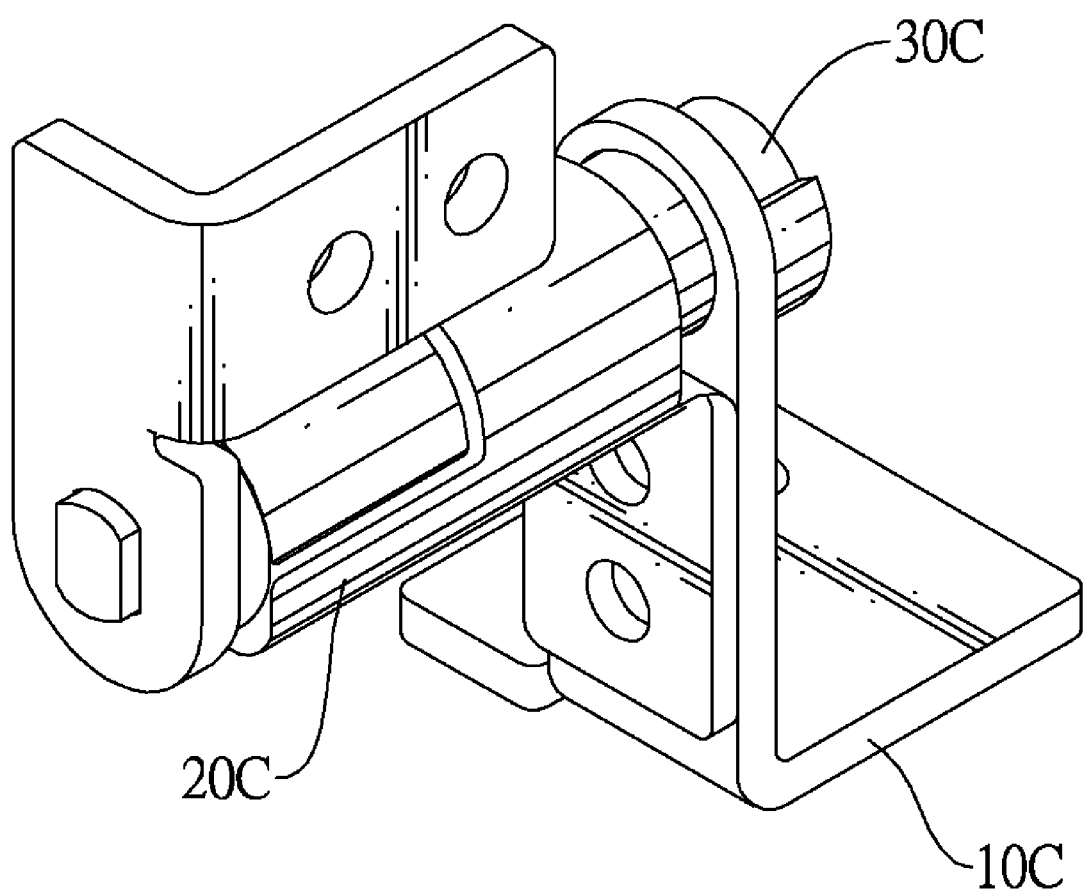
FIG. 8 is a perspective view of a fourth embodiment of a hinge in accordance with the present invention.
Figure 10:
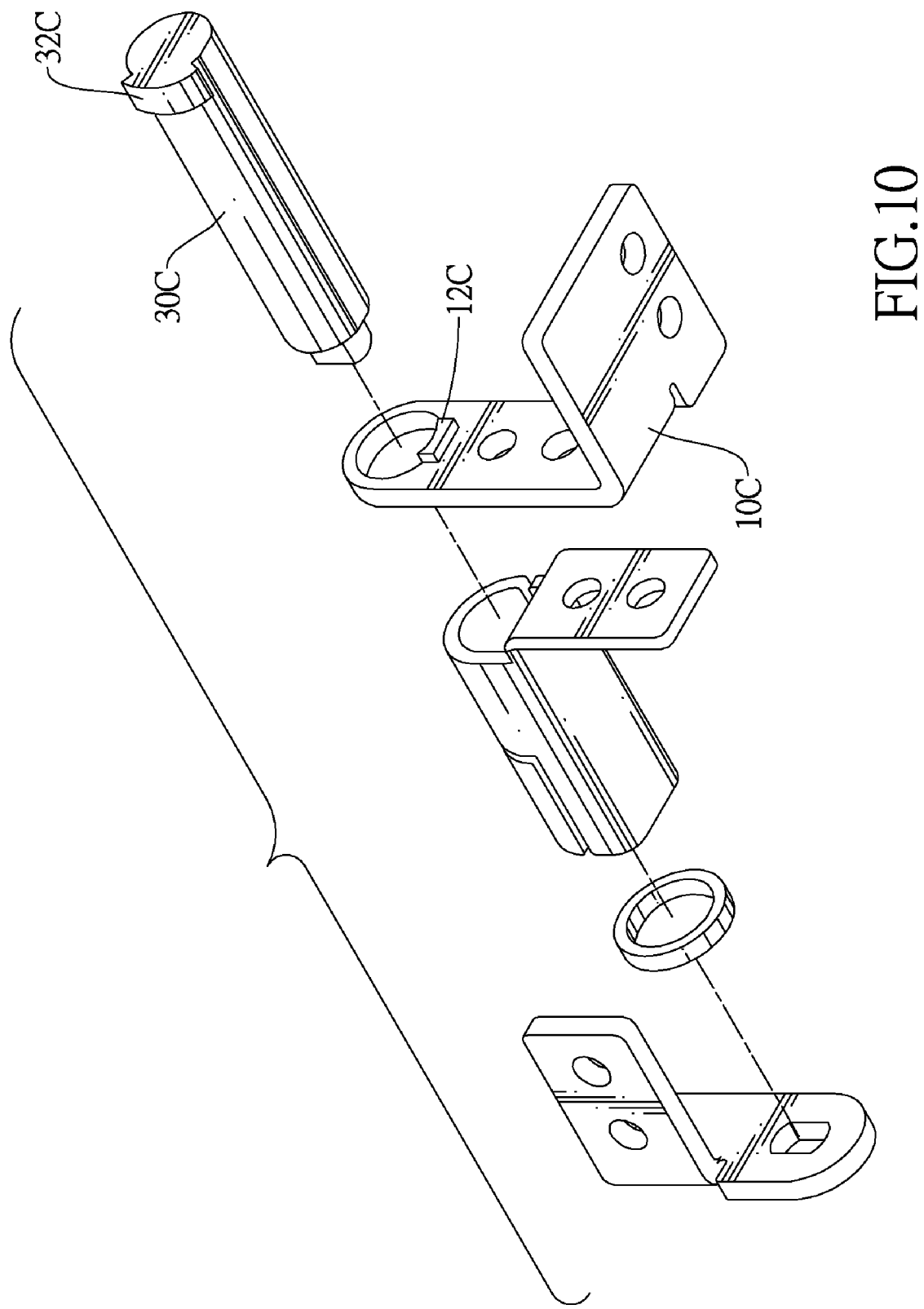
FIG. 10 is another exploded perspective view of the hinge in FIG. 8.
Figure 11:
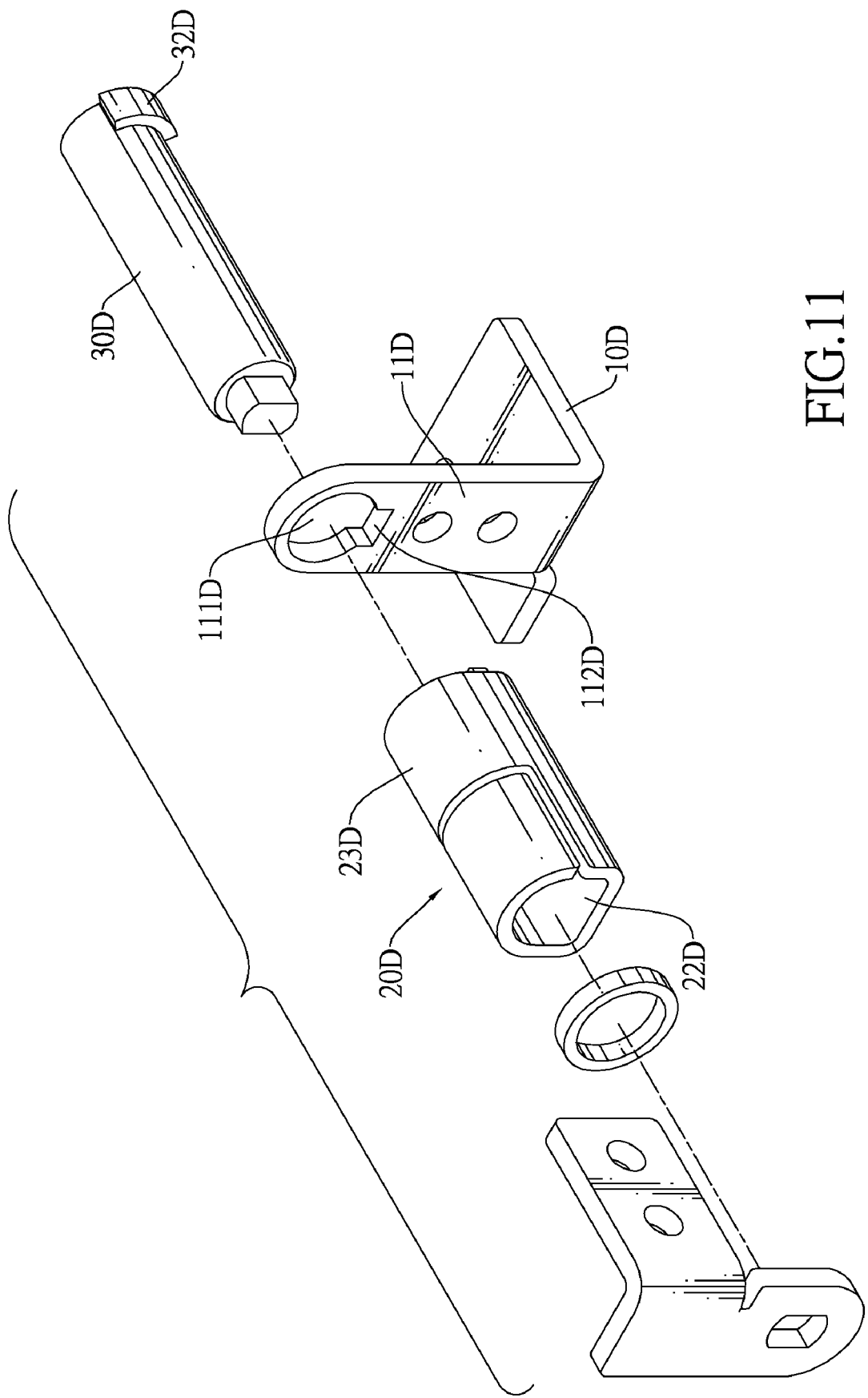
FIG. 11 is an exploded perspective view of a fifth embodiment of a hinge in accordance with the present invention.
Figure 12:
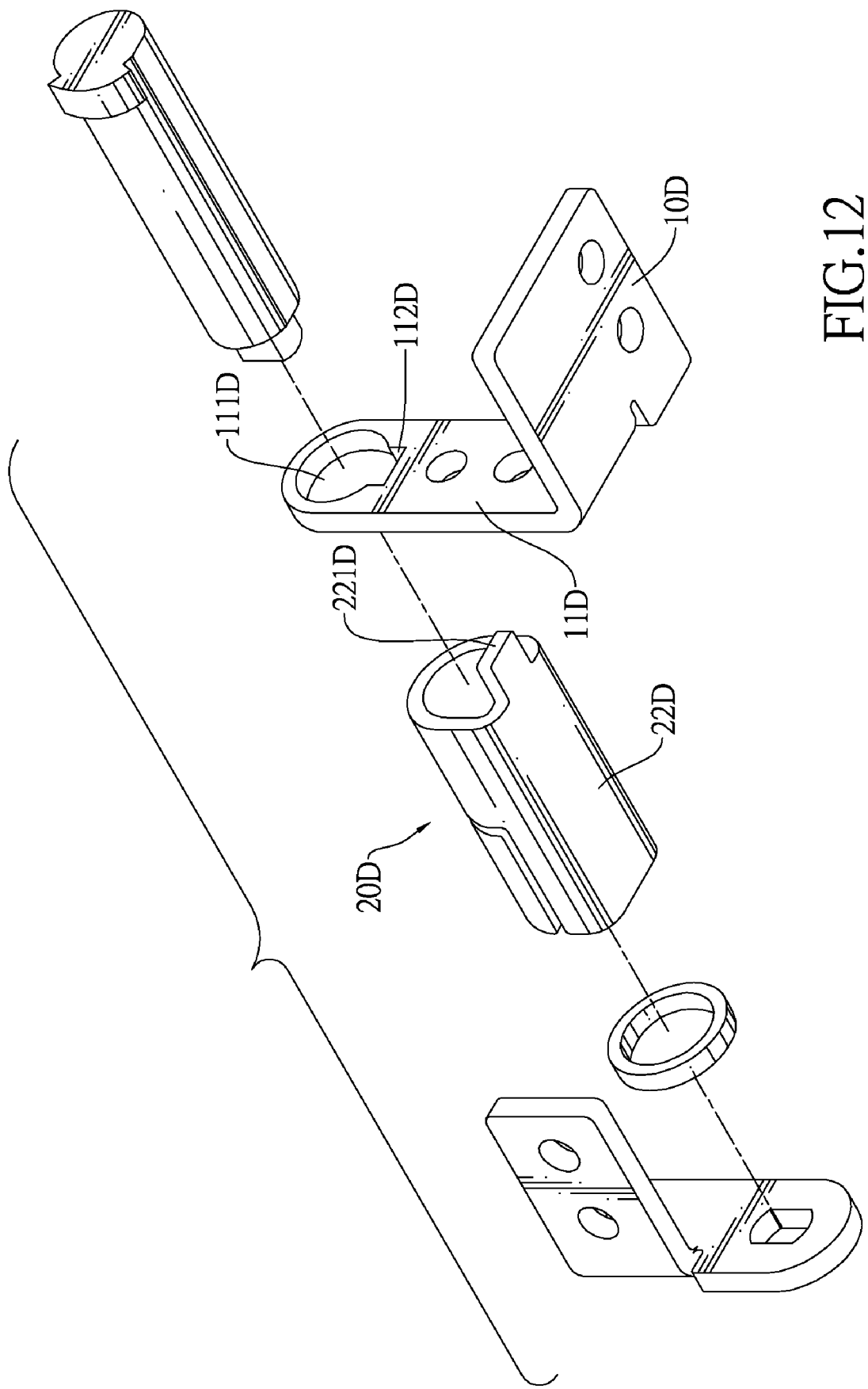
FIG. 12 is another exploded perspective view of the hinge in FIG. 11.

The hinge as described also provides a limiting function. In a preferred embodiment as shown in FIG. 3, the pintle (30) has a limiting protrusion (32) formed on and protruding transversely from an outside wall of the pintle (30). A stop (221D) is formed longitudinally on the first end of the positioning wing (221) and selectively abuts against the limiting protrusion (32) to limit the rotating angle of the pintle (30). In another preferred embodiment as shown in FIGS. 11 and 12, a recess (112D) is formed through the fastening wing (11D) having the supporting bracket (10D) and communicates with the through hole (111D). The stop (221D) is mounted through the recess (112D) and selectively abuts against the limiting protrusion (32D) to limit the rotating angle of the pintle (30D). In still another preferred embodiment as shown in FIGS. 8 to 10, a stop (12C) is formed on one side of the fastening wing (11C) adjacent to the through hole (111C). The stop (12C) selectively abuts against the limiting protrusion (32C) to limit the rotating angle of the pintle (30C).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a supporting bracket;
   a mounting bracket attached securely to the supporting bracket and having a positioning wing;
      two sleeves formed across the positioning wing and aligning with each other, with each sleeve having
         a connecting edge connecting with one side edge of the positioning wing;
         a free edge; and
         a slit formed between the free edge of the sleeve and the other side edge of the positioning wing; and
      a gap formed between the two sleeves;
   a pintle mounted rotatable through the two sleeves and having a flat wall selectively abutting against the positioning wing; and
   a rotating bracket mounted securely on the pintle, wherein the two sleeves of the mounting bracket protrude from different side edges of the positioning wing and the slits of the two sleeves misalign with each other.

2. The hinge as claimed in claim 1, wherein the positioning wing of the mounting bracket has a positioning rib formed longitudinally on an inside wall of the positioning wing and having a flat top surface selectively being flush with the flat wall of the pintle.

3. The hinge as claimed in claim 2, wherein the positioning rib of the mounting bracket has a groove formed longitudinally in the flat top surface of the positioning rib.

4. The hinge as claimed in claim 2, wherein the positioning rib of the mounting bracket has multiple grooves formed transversely in the flat top surface of the positioning rib.

5. The hinge as claimed in claim 1, wherein the positioning wing of the mounting bracket has multiple positioning protrusions formed transversely on an inside wall of the positioning wing, and each positioning protrusion has a flat top surface that is selectively flush with the flat wall of the pintle.

6. A hinge comprising:
a supporting bracket;
a mounting bracket attached securely to the supporting bracket and having
a positioning wing;
two sleeves formed across the positioning wing and aligning with each other, with each sleeve having
a connecting edge connecting with one side edge of the positioning wing;
a free edge; and
a slit formed between the free edge of the sleeve and the other side edge of the positioning wing; and
a gap formed between the two sleeves;
a pintle mounted rotatable through the two sleeves and having a flat wall selectively abutting against the positioning wing; and
a rotating bracket mounted securely on the pintle, wherein:
the supporting bracket has a fastening wing; and
the mounting bracket has a connecting wing protruding from one end of the positioning wing and attached to the fastening wing of the supporting bracket.

7. The hinge as claimed in claim 6, wherein the positioning wing of the mounting bracket has a flat inside wall selectively being flush with the flat wall of the pintle.

8. The hinge as claimed in claim 7, wherein the sleeves of the mounting bracket protrude from different side edges of the positioning wing and the slits of the sleeves misalign with each other.

9. The hinge as claimed in claim 7, wherein the sleeves of the mounting bracket protrude from the same side edges of the positioning wing and the slits of the sleeves align with each other.

10. The hinge as claimed in claim 7, wherein
the pintle has a limiting protrusion formed on and protruding transversely from an outside wall of the pintle; and
the mounting bracket has a stop formed longitudinally on a first end of the positioning wing and selectively abutting against the limiting protrusion of the pintle.

11. The hinge as claimed in claim 7, wherein
the supporting bracket has
a fastening wing;
a through hole formed through the fastening wing; and
a stop formed on one side of the fastening wing adjacent to the through hole; and
the pintle is mounted through the through hole of the supporting bracket and has a limiting protrusion formed on and protruding transversely from an outside wall of the pintle and selectively abutting against the stop of the supporting bracket.

12. The hinge as claimed in claim 6, wherein the sleeves of the mounting bracket protrude from the same side edges of the positioning wing and the slits of the sleeves align with each other.

13. The hinge as claimed in claim 6, wherein
the positioning wing of the mounting bracket has a first end and a second end; and
the connecting wing of the mounting bracket protrudes perpendicularly from the second end of the positioning wing.

14. The hinge as claimed in claim 6, wherein
the positioning wing of the mounting bracket has a first end and a second end; and
the connecting wing of the mounting bracket protrudes perpendicularly from the first end of the positioning wing.

15. The hinge as claimed in claim 6, wherein
the supporting bracket has
a fastening wing;
a through hole formed through the fastening wing; and
a stop formed on one side of the fastening wing adjacent to the through hole; and
the pintle is mounted through the through hole of the supporting bracket and has a limiting protrusion formed on and protruding transversely from an outside wall of the pintle and selectively abutting against the stop of the supporting bracket.

16. The hinge as claimed in claim 6 further comprising another mounting bracket, wherein
the positioning wing of each mounting bracket has a first end and a second end;
each mounting bracket has a connecting wing, wherein the connecting wing of one mounting bracket protrudes from the first end of the positioning wing and the connecting wing of the other mounting bracket protrudes from the second end of the positioning wing;
the supporting bracket has
a fastening wing attached securely between the connecting wings of the mounting brackets; and
a through hole formed through the fastening wing and aligning with the sleeves of the mounting brackets; and
the pintle is mounted through the sleeves of the mounting brackets and the through hole of the supporting brackets.

17. A hinge comprising:
a supporting bracket;
a mounting bracket attached securely to the supporting bracket and having a positioning wing;
two sleeves formed across the positioning wing and aligning with each other, with each sleeve having
a connecting edge connecting with one side edge of the positioning wing;
a free edge; and
a slit formed between the free edge of the sleeve and the other side edge of the positioning wing; and
a gap formed between the two sleeves;
a pintle mounted rotatably through the two sleeves and having a flat wall selectively abutting against the positioning wing; and
a rotating bracket mounted securely on the pintle, wherein:
the pintle has a limiting protrusion formed on and protruding transversely from an outside wall of the pintle; and
the mounting bracket has a stop formed longitudinally on a first end of the positioning wing and selectively abutting against the limiting protrusion of the pintle.

18. The hinge as claimed in claim 17, wherein
the supporting bracket has
a fastening wing;
a through hole formed through the fastening wing; and
a recess formed through the fastening wing and communicating with the through hole;
the stop of the mounting bracket is mounted through the recess; and
the pintle is mounted through the through hole of the supporting bracket.

19. The hinge as claimed in claim 17, wherein
the supporting bracket has a fastening wing; and
the mounting bracket has a connecting wing protruding from one end of the positioning wing and attached to the fastening wing of the supporting bracket.

* * * * *